Aug. 12, 1958 E. J. GATES 2,847,552
STEAM TABLES
Filed April 23, 1954

INVENTOR.
EARL J. GATES
BY
ATTORNEY

2,847,552

STEAM TABLES

Earl J. Gates, Affton, Mo., assignor to Servco Equipment Company, St. Louis, Mo., a corporation of Missouri Application April 23, 1954, Serial No. 425,250

4 Claims. (Cl. 219—43)

This invention relates in general to restaurant equipment and, more particularly, to certain new and useful improvements in steam tables.

In most restaurants and particularly restaurants of the cafeteria type many foods are prepared in large quantities and kept warm in steam stables which are tables equipped with depressed or sunken recesses which ordinarily contain hot water and are usually provided with steam pipes, gas burners, or submerged electric heating elements to keep the water hot. The pans into which the food is placed are removable for facility in cleaning, but the water-containing recess or well is conventionally constructed as an integral and stationary part of the table. Furthermore, the heating means is built into the structure so that drainage of the water becomes inconvenient and cleaning of the recess or well is rendered very difficut and time-consuming. As a result, many restaurant workers neglect the cleaning operation and a highly unsanitary condition develops, which not only is undesirable as a matter of proper restaurant operation, but, in most communities, constitutes an infraction of local health regulations.

It is, therefore, the primary object of the present invention to provide completely removable sanitary water receptacles for steam tables and the like.

It is another object of the present invention to provide a water receptacle of the type stated which is capable of maintaining the desired temperature of the food and can be cleaned in a simple, efficient, and thorough manner.

It is a further object of the present invention to provide a steam table water receptacle of the type stated which is efficiently heated by wholly external means which do not impair the removability or sanitary nature of the water receptacle.

With the above and other objects in view, my invention resides in the novel features of form, construction, arrangement, and combination of parts presently described and pointed out in the claims.

In the accompanying drawing—

Figure 2 is a fragmentary sectional view taken along line 2—2 of Figure 1; and

Figure 3 is a fragmentary sectional view taken along line 3—3 of Figure 2.

Figure 1:
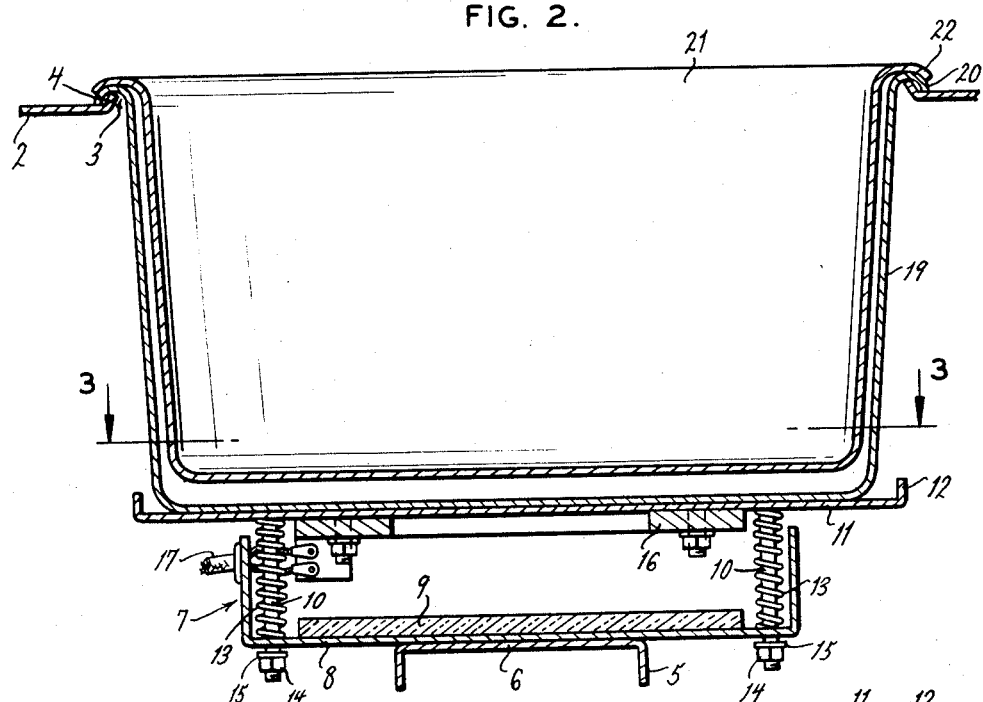
Figure 1 is a fragmentary front elevational view of a steam table constructed in accordance with and embodying the present invention.
Figure 1:
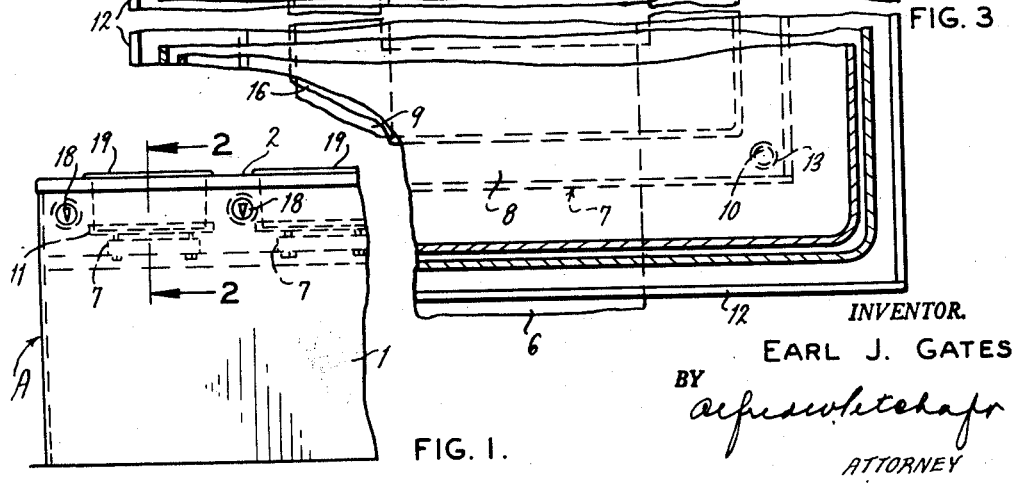

Referring now in more detail and by reference characters to the drawing which illustrates a preferred embodiment of the present invention, A designates a hollow, box-like steam table including a vertical apron wall 1 facing in the direction of the service-personnel or worker and having a horizontal top wall 2 provided with a plurality of rectangular openings 3 bordered with narrow upturned legs or flanges 4. Rigidly mounted within the steam table A and extending lengthwise and horizontally thereacross in downwardly spaced relation to the top wall 2 is a channel-shaped beam 5 having an upwardly presented flat bight 6. As will be seen by reference to Figures 2 and 3, the beam 5 is centered with respect to the openings 3.

Spot welded or otherwise rigidly secured upon the upper face of the bight 6 of the beam 5 in downwardly spaced symmetrical relation to each opening 3 is an open topped shallow box 7 formed preferably of sheet metal and including a rectangular bottom wall 8 which is in turn provided upon its upwardly presented face with a rectangular panel 9 formed of heavy gauge asbestos board or other similar material having heat-insulative properties. Shiftably mounted in the bottom wall 8, respectively adjacent to the four corners thereof, are four vertical rods 10 rigidly fastened at their upper ends to the under face of a rectangular plate 11, which is provided around its four peripheral margins with a narrow continuous upstanding flange 12. Disposed encirclingly about each rod 10 is a compression spring 13 abuttingly engaged at its opposite ends against the opposed faces of the plate 11 and bottom wall 8. At their downwardly projecting ends, the rods 10 are threaded and provided with retainer nuts 14 and washers 15 for limiting the upwardly movement of the rods 10 under influence of the springs 13. Bolted or otherwise rigidly secured on the under face of the plate 11 is an electric heating element 16 which is conventional so far as its internal construction is concerned and is conventionally connected by a two-wire electrical conductor 17 to a manually controllable thermostat 18 mounted in the apron-wall 1, as shown in Figure 1. It should be noted in this connection that the heating element 16 is mounted in tight facewise contact against the plate 11 in order to insure maximum efficiency in heat transfer.

Provided for removable disposition within each aperture 3 is a substantially rectilinear water receptacle 19 preferably stamped out of a single piece of stainless steel and provided around its upper margin with an arcuately down-turned lip or flange 20 adapted to fit over and around the aperture-flange 4, as best seen in Figure 2. It should be noted that the vertical dimensions of the water receptacle 19 are such that the bottom wall of the water receptacle 19 will rest snugly in facewise contact with the plate 11 and is heavy enough to overpower the springs 13. Actually, when the water receptacle 19 is empty, the downwardly presented edges of the flange 20 will not rest upon the top wall 2, but will do so when the usual quantity of water is placed therein. Under all operating conditions, the springs 13 will hold the plate 11 firmly up against the bottom of the water receptacle 19 to insure even distribution of heat and good heat transfer.

Provided for removably nested disposition within the water receptacle 19 is a food-pan 21 also stamped from a single sheet of stainless steel and is provided around its peripheral margin with a down-turned flange 22 sized to fit over the flange 20 of the water receptacle 19, as best seen in Figure 2. The dimensions of the food-pan 21 are such that it will fit within the water receptacle 19 with space all around the bottom and sides so that it is, in effect, water-jacketed when water is in the water receptacle 19. For certain types of food it is even possible to omit water from the water receptacle 19, relying upon the thermostat 18 to maintain a desired temperature, in which case the food-pan 21 is, in effect, jacketed with hot air. This latter type of function may be employed where the particular food should be held at a temperature higher than 212° F. and is particularly useful for certain types of meats and the like.

As will be readily apparent, the food-pans 21 and water receptacles 19 can be quickly and easily removed at will from the steam table A for thorough and sanitary cleansing. When the water receptacle is returned to operative position, it will reseat itself effectively upon the plate in efficient heat-transfer contact therewith.

It should be understood that changes and modifications in the form, construction, arrangement, and combination of the several parts of the steam table may be made and substituted for those herein shown and described without departing from the nature and principle of my invention.

Having thus described my invention, what I claim and desire to secure by Letters Patent is:

1. Food storage and serving means for use in restaurants and the like comprising a horizontal table top having an aperture therein, support means rigidly mounted in downwardly spaced relation to the opening, a horizontal plate shiftably mounted on the support member for vertically shifting movement with respect thereto, spring means for biasing the plate upwardly, heating means operatively mounted on the under side of the plate, a first pan mounted in and extending downwardly through said opening and having a flat bottom wall in facewise contact with said plate, and a second pan of somewhat smaller dimension than, and geometrically similar in shape with respect to, the first pan for nested disposition therein, said second pan having a peripheral rim extending outwardly over the periphery of the first pan for supporting the second pan with its side and bottom walls in spaced relation to the first pan, said spring means and the weight of said first pan, when loaded, being so balanced that the first pan will be suspended within the opening and in contact with the table top and also will contact the plate.

2. Food storage and serving means for use in restaurants and the like comprising a horizontal table top having an aperture therein horizontal, support means rigidly mounted in downwardly spaced relation to the opening, a horizontal plate having a plurality of vertical pins rigidly mounted on and depending from its under side, said pins being shiftably mounted on and extending through the support member for vertically shifting movement with respect thereto, spring means disposed encirclingly around each pin in edgewise abutment against the plate and support means for biasing the plate upwardly, heating means operatively mounted on the under side of the plate, a first pan having an outwardly projecting marginal lip adapted to overhang the margins of the aperture in the table top, said first pan being mounted in and extending downwardly through said opening and having a flat bottom wall which is entirely in facewise contact with said plate, and a second pan of somewhat smaller dimension than, and geometrically similar in shape with respect to, the first pan for nested disposition therein, said second pan having a peripheral rim extending outwardly over the periphery of the first pan for supporting the second pan with its side and bottom walls in spaced relation to the first pan, said spring means and the weight of said first pan, when loaded, being so balanced with respect to each other that the first pan will be suspended within the opening by means of said marginal lip and the plate will be firmly pressed against the downwardly presented surface of the pan-bottom.

3. Food storage and serving means for use in restaurants and the like comprising a horizontal table top having an aperture therein bordered by a narrow upturned flange, horizontal support means rigidly mounted in downwardly spaced relation to the opening, a horizontal plate having a plurality of vertical pins rigidly mounted on and depending from its under side, said pins being shiftably mounted on and extending through the support member for vertically shifting movement with respect thereto, spring means disposed encirclingly around each pin in edgewise abutment against the plate and support means for biasing the plate upwardly, electric heating means operatively mounted on the under side of the plate, a first pan having outwardly projecting marginal lip adapted to overhang the upturned flange said first pan being mounted in and extending downwardly through said opening and having a flat bottom wall which is entirely in facewise contact with said plate, and a second pan of somewhat smaller dimension than, and geometrically similar in shape with respect to, the first pan for nested disposition therein, said second pan having a peripheral rim extending outwardly over the periphery of the first pan for supporting the second pan with its side and bottom walls in spaced relation to the first pan, said spring means and the weight of said first pan, when loaded, being so balanced with respect to each other that the first pan will be suspended within the opening by means of the coaction of said marginal lip and upturned flange and the plate will be firmly pressed against the downwardly presented surface of the pan-bottom.

4. Food storage and serving means for use in restaurants and the like comprising a horizontal table top having an aperture therein, support means rigidly mounted in downwardly spaced relation to the opening, a horizontal plate having a plurality of vertical pins rigidly mounted on and depending from its under side, said pins being shiftably mounted on and extending through the support member for vertically shifting movement with respect thereto, spring means encircling said pins for biasing the plate upwardly, a nut for each pin for adjusting the tension of the spring means, heating means operatively mounted on the under side of the plate, a first pan having an outwardly projecting marginal lip adapted to over-hang the margin of the aperture in the table top, said pan being mounted in and extending downwardly through said opening with its bottom wall in contact with said plate, and a second pan of somewhat smaller dimension than, and geometrically similar in shape with respect to, the first pan for nested disposition therein, said second pan having a peripheral rim extending outwardly over the periphery of the first pan for supporting the second pan with its side and bottom walls in spaced relation to the first pan, said spring means and the weight of said first pan, when loaded, being so balanced with respect to each other that the pan will be suspended within the opening by means of said marginal lip and the plate will be firmly pressed against the downwardly presented surface of the pan bottom.

References Cited in the file of this patent

UNITED STATES PATENTS

| | | |
|---|---|---|
| 194,224 | Culbertson | Aug. 14, 1877 |
| 1,120,758 | Stirn | Dec. 15, 1914 |
| 1,151,189 | Kercher | Aug. 24, 1915 |
| 1,233,922 | Schmidt | July 17, 1917 |
| 1,505,299 | Stirn | Aug. 19, 1924 |
| 1,746,261 | Keplinger | Feb. 11, 1930 |
| 2,187,888 | Nachumsohn | Jan. 23, 1940 |
| 2,329,760 | Heilman | Sept. 21, 1943 |
| 2,422,350 | Gross | June 17, 1947 |
| 2,664,495 | Wehrli | Dec. 29, 1953 |
| 2,679,841 | Muckler | June 1, 1954 |
| 2,709,215 | Miller | May 24, 1955 |

FOREIGN PATENTS

| | | |
|---|---|---|
| 430,806 | Italy | Feb. 20, 1948 |